United States Patent [19] [11] 3,897,433
Dupont et al. [45] July 29, 1975

[54] 1,7-DIHYDRO-1,3,7-TRI-LOWER-ALKYL-2H-PYRROLO [2,3-D] PYRIMIDINE-2,4(3H)-DIONES

[75] Inventors: Paul E. Dupont; George Y. Lesher, both of Schodack, N.Y.

[73] Assignee: Sterling Drug Inc., New York, N.Y.

[22] Filed: Sept. 28, 1973

[21] Appl. No.: 401,647

[52] U.S. Cl. ..... 260/256.4 F; 260/256.4 C; 424/251
[51] Int. Cl.² ........................................ C07D 239/00
[58] Field of Search .............................. 260/256.4 F

[56] References Cited
OTHER PUBLICATIONS
Shigeo, "Chemical Abstracts", Vol. 78, 1973, Col. 4267a.

Shigeo, "Chemical Abstracts", Vol. 78, 1973, Col. 4272y.

*Primary Examiner*—Donald G. Daus
*Assistant Examiner*—James H. Turnipseed
*Attorney, Agent, or Firm*—William G. Webb; B. Woodrow Wyatt

[57] ABSTRACT

1,7-Dihydro-1,3,7-tri-lower-alkyl-2H-pyrrolo-[2,3-d]-pyrimidine-2,4(3H)-diones, useful as anti-hypertensive agents, are prepared by reaction of a chloroacetaldehyde di-lower-alkyl acetal with a 1,3-di-lower-alkyl-6-aminouracil and reaction of the resulting 1,7-dihydro-1,3-di-lower-alkyl-2H-pyrrolo[2,3-d]-pyrimidine-2,4(3H)-dione with a lower-alkyl ester of a strong mineral acid in the presence of an acid-acceptor.

3 Claims, No Drawings

1,7-DIHYDRO-1,3,7-TRI-LOWER-ALKYL-2H-PYRROLO [2,3-D] PYRIMIDINE-2,4(3H)-DIONES

This invention relates to 1,7-dihydro-1,3,7-trilower-alkyl-2H-pyrrolo[2,3-d]pyrimidine-2,4(3H)-diones, which are useful as anti-hypertensive agents, represented by formula I:

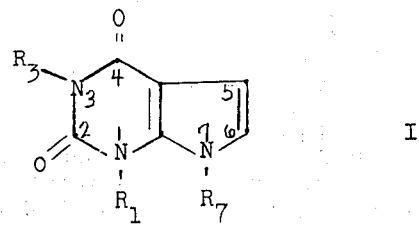

where $R_1$, $R_3$ and $R_7$ each represents the same or different loweralkyl, where the term "lower-alkyl" means saturated, monovalent, aliphatic radicals, including straight or branched chain radicals, of from one to four carbon atoms, as illustrated by methyl, ethyl, propyl, isopropyl, butyl, sec.-butyl, isobutyl and t-butyl.

The compounds of formula I are prepared by reacting a 1,3-di-lower-alkyl-6-aminouracil of formula II with chloroacetaldehyde using the procedure described by Noell et al., J. Het. Chem. 1, 34–41 (1964), followed by alkylation of the resulting 1,7-dihydro-1,3-di-lower-alkyl-2H-pyrrolo[2,3-d]-pyrimidine-2,4(3H)-dione (corresponding to formula I where $R_7$ is hydrogen) by treatment of the latter with a lower-alkyl ester of a strong mineral acid, e.g. a lower-alkyl halide or a di-lower-alkyl sulfate, in the presence of an acid-acceptor. The method is represented by the following reaction sequence, where $R_1$, $R_3$ and $R_7$ have the meanings given above, and X represents the anion of a strong mineral acid:

(based on the uracil) of sodium acetate. Alkylation of the 1,7-dihydro-1,3-di-lower-alkyl-2H-pyrrolo[2,3-d]pyrimidine-2,4(3H)-dione of formula II is preferably carried out in an organic solvent insert under the conditions of the reaction, for example acetone, ethyl acetate or dimethylformamide. Suitable acid-acceptors are sodium or potassium carbonate or sodium or potassium bicarbonate.

The 1,3-di-lower-alkyl-6-aminouracils of formula II are a known class of compounds. [See for example Papesch et al., J. Org. Chem. 16, 1879–90 (1951)].

In a standard antihypertensive activity test described by Kersten et al., J. Lab. Clin. Med. 32, 1090–1098 (1947), the compounds of the invention, when administered to unanesthetized, spontaneous hypertensive rats, were found to possess anti-hypertensive activity, thus indicating their usefulness as anti-hypertensive agents.

The actual determination of the numerical biological data definitive for a particular compound of formula I is readily made by standard test procedures by technicians versed in biological test procedures without the need for any extensive experimentation.

The compounds can be prepared for use by dissolving under sterile conditions in a physiologically compatible medium and storing in ampoules for intramuscular injection. Alternatively, they can be incorporated in unit dosage form as tablets or capsules for oral administration either alone or in combination with suitable adjuvants, such as calcium carbonate, starch, lactose, talc, magnesium stearate, gum acacia, and the like. Still further, the compounds can be formulated for oral administration in aqueous alcohol, glycol or oil solutions or oil-water emulsions in the same manner as conventional medicinal substances are prepared. They

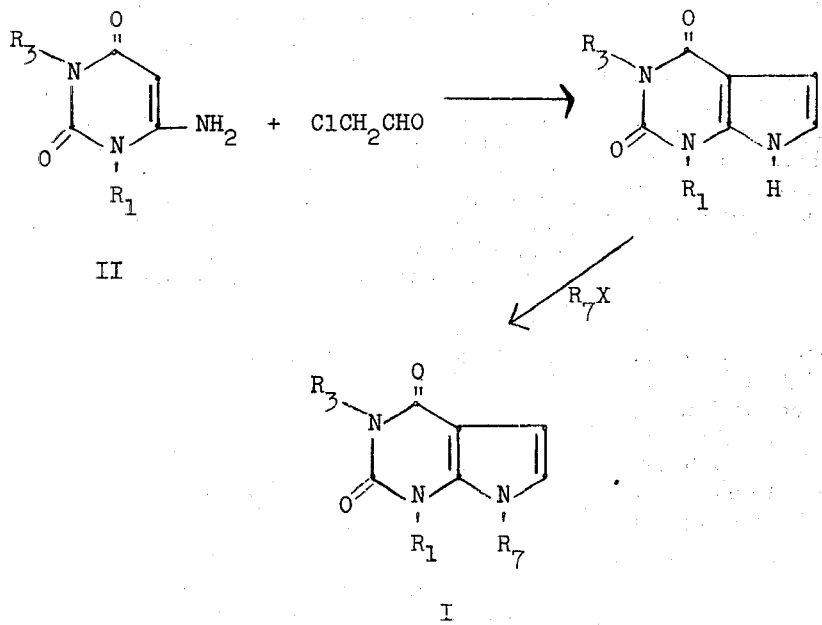

The first step, the reaction of the 1,3-di-lower-alkyl-6-aminouracil with chloroacetaldehyde, is preferably carried out by warming an aqueous solution of the uracil and the chloroacetaldehyde, the latter preferably in the form of a di-lower-alkyl acetal, containing a molar excess of a strong mineral acid, for example hydrochloric acid or sulfuric acid, and two molar equivalents are formulated and used in the same manner as conventional hypotensive agents, such as reserpine preparations, and indeed can be used advantageously in combination with such hypotensive agents.

The molecular structures of the compounds of the invention were assigned on the basis of study of their infrared, ultraviolet, and NMR spectra, and confirmed by the correspondence between calculated and found values for elementary analyses for the elements.

The following examples will further illustrate the invention without, however, limiting it thereto. All melting points are uncorrected.

EXAMPLE 1

A solution of 91 g. (0.73 mole) of chloroacetaldehyde dimethyl acetal and 56 g. (0.68 mole) of sodium acetate in 210 ml. of water containing 14 ml. of concentrated hydrochloric acid was prepared by warming to 85°–90°C., and the warm solution added all at once to a separate solution of 70 g. (0.45 mole) of 1,3-dimethyl-6-aminouracil and 28 g. (0.34 mole) of sodium acetate in 350 ml. of water at 90°C. The mixture was stirred for about ten minutes at 90°–95°C., then cooled in an ice/water bath. The product which separated was collected, washed with water and acetone, and dried to give 39.4 g. of 1,7-dihydro-1,3-dimethyl-2H-pyrrolo[2,3-d]pyrimidine-2,4(3H)-dione, m.p. 278°–291°C.

To a mixture of 17.9 g. (0.1 mole) of the latter and 29.0 g. (0.21 mole) of potassium carbonate in 125 ml. of dimethylformamide was added 15.7 g. (0.1 mole) of methyl iodide, and the mixture was stirred for about fifteen hours at room temperature and then poured into 1250 ml. of water. The solid which separated was collected and recrystallized once from chloroform and twice from acetonitrile to give 10.4 g. of 1,7-dihydro-1,3,7-trimethyl-2H-pyrrolo[2,3-d]pyrimidine-2,4(3H)-dione, m.p. 263°–265°C.

The latter compound, when administered orally to spnotaneous hypertensive rats using the photoelectric tensometer foot test method described by Kersten et al., loc. cit., was found to have an Average Hypotensive Dose$_{40}$ of 30 mg./kg.

EXAMPLE 2

Reaction of chloroacetaldehyde dimethyl acetal with 1-ethyl-3-methyl-6-aminouracil followed by reaction of the resulting 1,7-dihydro-1-ethyl-3-methyl-2H-pyrrolo[2,3-d]pyrimidine-2,4(3H)-dione with methyl iodide in the presence of potassium carbonate using the procedure described above in Example 1 affords 1,7-dihydro-1-ethyl-3,7-dimethyl-2H-pyrrolo[2,3-d]pyrimidine-2,4(3H)-dione.

EXAMPLE 3

Reaction of chloroacetaldehyde dimethyl acetal with 1-isopropyl-3-methyl-6-aminouracil followed by reaction of the resulting 1,7-dihydro-1-isopropyl-3-methyl-2H-pyrrolo[2,3-d]pyrimidine-2,4((3H)-dione with methyl iodide in the presence of potassium carbonate using the procedure described above in Example 1 affords 1,7-dihydro-1-isopropyl-3,7-dimethyl-2H-pyrrolo[2,3-d]pyrimidine-2,4(3H)-dione.

EXAMPLE 4

Reaction of chloroacetaldehyde dimethyl acetal with 1-isobutyl-3-methyl-6-aminouracil followed by reaction of the resulting 1,7-dihydro-1-isobutyl-3-methyl-2H-pyrrolo[2,3-d]pyrimidine-2,4(3H)-dione with methyl iodide in the presence of potassium carbonate using the procedure described above in Example 1 affords 1,7-dihydro-1-isobutyl-3,7-dimethyl-2H-pyrrolo[2,3-d]pyrimidine-2,4(3H)-dione.

EXAMPLE 5

Reaction of chloroacetaldehyde dimethyl acetal with 1,3-diethyl-6-aminouracil followed by reaction of the resulting 1,7-dihydro-1,3-diethyl-2H-pyrrolo[2,3-d]pyrimidine-2,4(3H)-dione with ethyl iodide in the presence of potassium carbonate using the procedure described above in Example 1 affords 1,7-dihydro-1,3,7-triethyl-2H-pyrrolo[2,3-d]pyrimidine-2,4(3H)-dione.

EXAMPLE 6

Reaction of chloroacetaldehyde dimethyl acetal with 1-butyl-3-ethyl-6-aminouracil followed by reaction of the resulting 1,7-dihydro-1-butyl-3-ethyl-2H-pyrrolo[2,3-d]pyrimidine-2,4(3H)-dione with propyl iodide in the presence of potassium carbonate using the procedure described above in Example 1 affords 1,7-dihydro-1-butyl-3-ethyl-7-propyl-2H-pyrrolo[2,3-d]pyrimidine-2,4(3H)-dione.

EXAMPLE 7

Reaction of chloroacetaldehyde dimethyl acetal with 1-methyl-3-propyl-6-aminouracil followed by reaction of the resulting 1,7-dihydro-1-methyl-3-propyl-2H-pyrrolo[2,3-d]pyrimidine-2,4(3H)-dione with t-butyl iodide in the presence of potassium carbonate using the procedure described above in Example 1 affords 1,7-dihydro-1-methyl-3-propyl-7-t-butyl-2H-pyrrolo[2,3-d]pyrimidine-2,4(3H)-dione.

EXAMPLE 8

Reaction of chloroacetaldehyde dimethyl acetal with 1-ethyl-3-butyl-6-aminouracil followed by reaction of the resulting 1,7-dihydro-1-ethyl-3-butyl-2H-pyrrolo[2,3-d]pyrimidine-2,4(3H)-dione with isopropyl iodide in the presence of potassium carbonate using the procedure described above in Example 1 affords 1,7-dihydro-1-ethyl-3-butyl-7-isopropyl-2H-pyrrolo[2,3-d]pyrimidine-2,4(3H)-dione.

EXAMPLE 9

Reaction of chloroacetaldehyde dimethyl acetal with 1,3-dibutyl-6-aminouracil followed by reaction of the resulting 1,7-dihydro-1,3-dibutyl-2H-pyrrolo[2,3-d]pyrimidine-2,4(3H)-dione with butyl iodide in the presence of potassium carbonate using the procedure described above in Example 1 affords 1,7-dihydro-1,3,7-tributyl-2H-pyrrolo[2,3-d]pyrimidine-2,4(3H)-dione.

We claim:

1. A compound having the formula

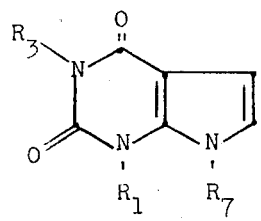

where $R_1$, $R_3$ and $R_7$ each represents the same or different lower-alkyl having from one to four carbon atoms.

2. A compound according to claim 1 where each of $R_1$, $R_3$ and $R_7$ is the same lower-alkyl.

3. 1,7-Dihydro-1,3,7-trimethyl-2H-pyrrolo[2,3-d]pyrimidine-2,4(3H)-dione according to claim 2.

* * * * *

UNITED STATES PATENT AND TRADEMARK OFFICE
CERTIFICATE OF CORRECTION

PATENT NO. : 3,897,433
DATED : July 29, 1975
INVENTOR(S) : Paul E. Dupont et al.

It is certified that error appears in the above-identified patent and that said Letters Patent are hereby corrected as shown below:

Column 1, line 3, "trilower" should read --tri-lower--.

Column 1, line 17, "loweralkyl" should read --lower-alkyl--.

Column 2, line 4, "insert" should read --inert--.

Column 3, line 33 "spnotaneous" should read --spontaneous--.

Signed and Sealed this

Ninth Day of March 1982

[SEAL]

Attest:

GERALD J. MOSSINGHOFF

Attesting Officer     Commissioner of Patents and Trademarks